Aug. 27, 1946.  A. P. DAVIS  2,406,324
GUN CONTROL SYSTEM
Filed Sept. 6, 1933  2 Sheets-Sheet 1
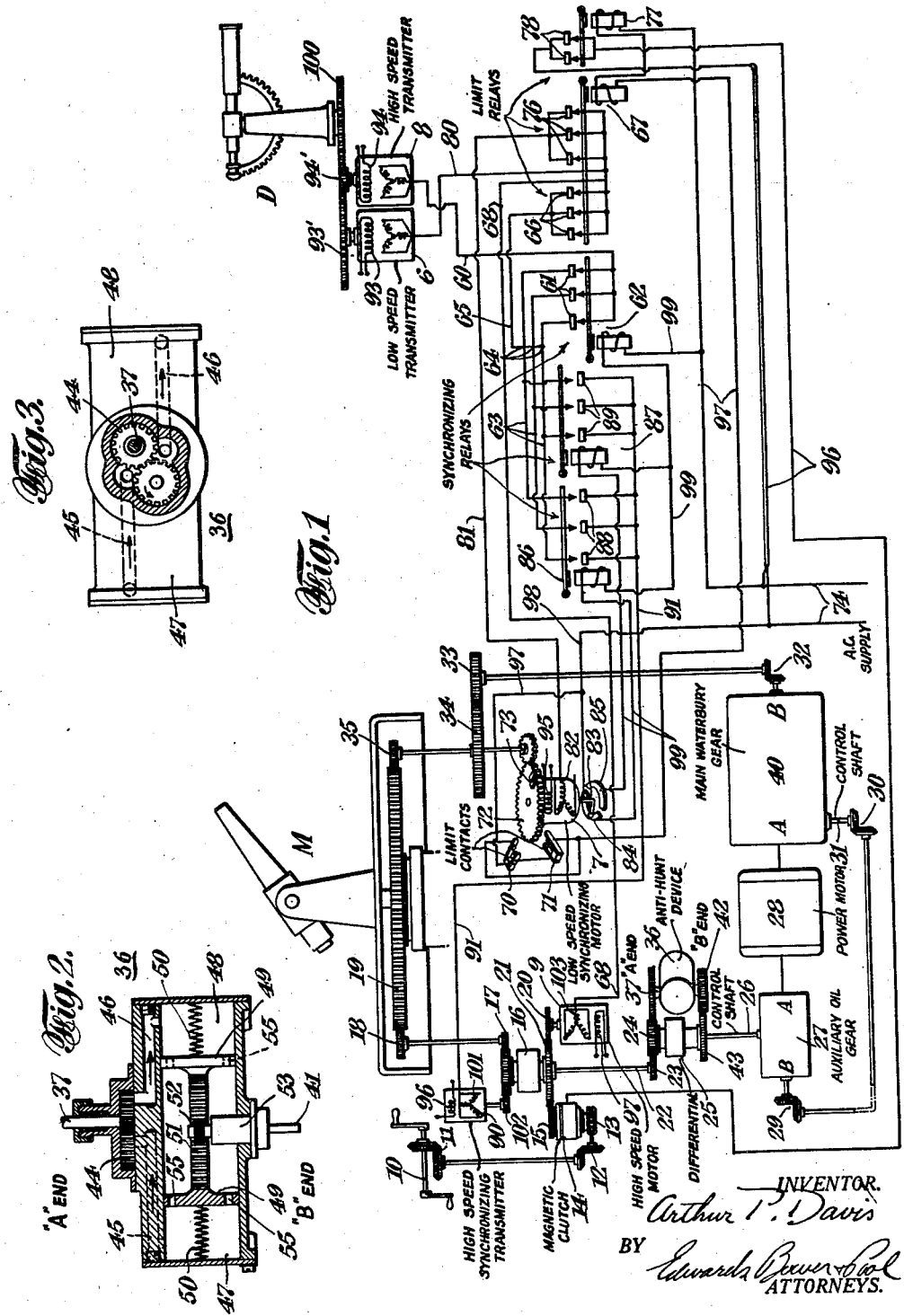

Aug. 27, 1946.  A. P. DAVIS  2,406,324
GUN CONTROL SYSTEM
Filed Sept. 6, 1933  2 Sheets-Sheet 2

INVENTOR
Arthur P. Davis
BY
Edwards, Bower & Pool
ATTORNEYS

Patented Aug. 27, 1946

2,406,324

UNITED STATES PATENT OFFICE 2,406,324

GUN CONTROL SYSTEM

Arthur Pattison Davis, New York, N. Y., assignor to Arma Corporation, a corporation of New York Application September 6, 1933, Serial No. 688,285

9 Claims. (Cl. 89—41)

This invention relates to systems for the control of the positions and movements of gun mounts and the like to follow the movements of a primary element such as a sighting device or gun director.

The main object of the invention is to provide a combined automatic and manual control involving simple control circuits and providing accurate and efficient means for moving the gun mount or other secondary element.

Figure 4:
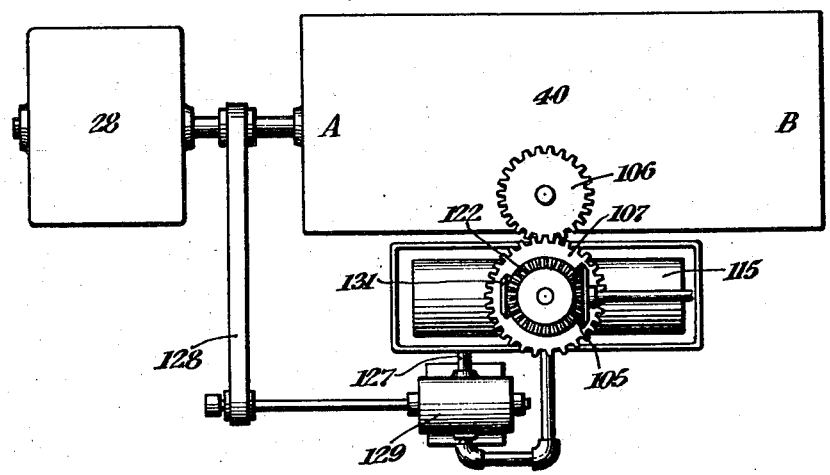
Figure 5:
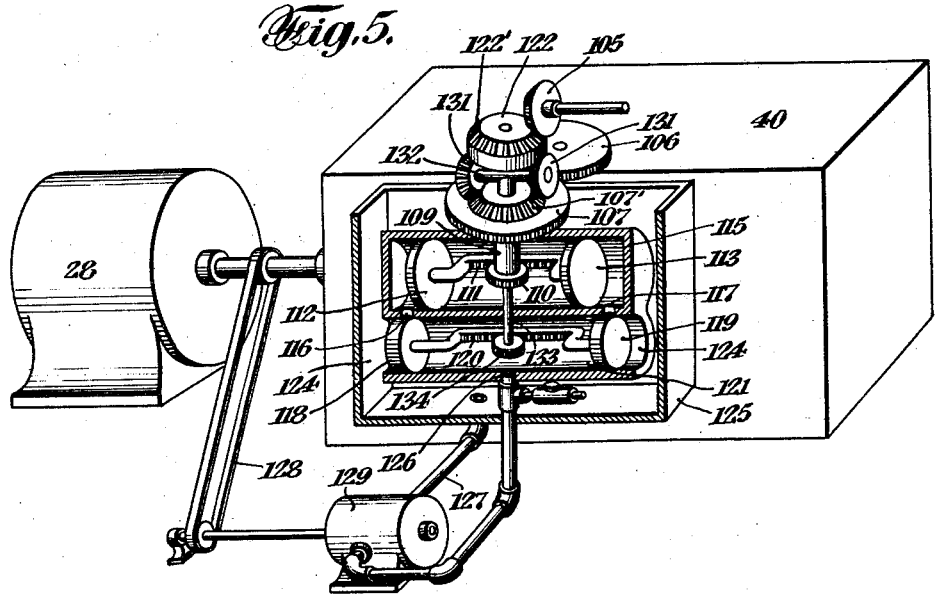

Further objects of the invention particularly in the reduction of the reaction on the hand wheels of the manual control and the very critical precision of the gun mount moving will appear from the following specification taken in connection with the accompanying drawings in which Fig. 1 is a diagram of a control system illustrating one embodiment of this invention;

Fig. 2 is a vertical section view of one of the devices employed in said system, Fig. 3 is a plan view of the device shown in Fig. 2, Fig. 4 is a plan view in outline of a modified detail, and Fig. 5 is an elevational view with parts in section of the apparatus shown in Fig. 4.

In the specific embodiment shown in the drawings, the system is illustrated in connection with a gun director D and a gun mount M. Electrical means are provided for controlling the movements of the gun mount M to follow very precisely the movements of the gun director D, said means comprising transmitters of the self-synchronous type at the director, low speed transmitter 6 being connected to drive the low speed synchronizing motor 7 at the gun mount and a high speed transmitter 8 being connected to drive the high speed motor 9.

An alternative hand operation is provided by connecting the hand wheels 10 to gears 11, 12, 13 and clutch 14 and gears 15 to one side of the differential 16, the other side of the differential 16 being geared at 17 and 18 to the gun mount table gear 19. The hand drive is geared to the differential by gears 15 on one side of the differential gear 21 while the high speed motor 9 of the automatic control has its gear 20 meshed with the other side of gear 21. When the automatic drive is in operation the clutch 14 of the magnetic type is released and when the drive is shifted to hand operation the clutch 14 is engaged to complete the train of gearing from the hand wheels 10 through to the gun mount table gear 19.

Taking first the hand operating means, the hand wheels 10 being connected to one side of the differential 16 and the gun mount 19 to the other side, the output of the differential 16 is proportional to the angular difference between gun mount 19 and hand wheels 10 and the speed of the output shaft 22 of differential 16 is proportional to the difference in speed between the gun mount 19 and hand wheels 10.

This output shaft 22 of differential 16 is geared at 23, 24 to one side of differential 25 and through this differential and its output shaft 26 to the control box of the oil gear 27. The output of differential 16 is thus transmitted to control shaft 26 of the oil gear but with a modification at the differential 25 which, as is later explained in detail, subtracts from the angularity of shaft 22 an angle proportional to the differential speed of the gun mount 19 and hand wheels 10 at each instant.

The input or "A" end of the auxiliary oil gear 27 is driven at substantially constant speed by the power motor 28 and the speed of the "B" or output end is proportional to the deflection of the control shaft 26. The output of oil gear 27 is connected by gearing 29, 30 to the control shaft 31 for the tilting box of the main oil gear 40 (of the variable speed type) having its "A" end driven by motor 28 and its "B" end connected by gears 32, 33, 34 and 35 to drive the gun mount gear 19. The speed of the "B" end of main oil gear 40 is proportional to the deflection of control shaft 31. It follows that the acceleration of the "B" end of gear 40 is proportional to the speed of the control shaft 31 and therefore also proportional to the deflection of the control shaft 26 of the auxiliary gear 27. Since the "B" end of gear 40 is geared to the gun mount gear 19 and since torque is proportional to acceleration it follows that the torque applied to gun mount gear 19 is proportional to the deviation of the gun mount from the position of the hand wheels 10 minus a factor "f" interposed between shafts 22 and 26 and regulated to be proportional to the differential velocity of the gun mount gear 19.

By properly proportioning this factor "f" the system can be critically damped to avoid hunting while at the same time reducing to a minimum the instantaneous deviation of the gun mount M from the director D. For example, if $a$ is taken as equal to the instantaneous deviation of the gun mount M from the director, it is also proportional to the output of differential 16. The factor $f$ thus is proportional to the differential speed $$\frac{da}{dt}$$

of gun mount gear 19 and is added algebraically to $a$ between shafts 22 and 26 by differential 25 and its associated "anti-hunt" device 36.

The deflection of control shaft 26 of oil gear 27 is proportional to this algebraic sum $$a + \frac{da}{dt}$$

Therefore, since the speed of the "B" end of gear 27 is proportional to the deflection of shaft 26, the speed of control shaft 31, which is geared to the "B" end of gear 27, is proportional to the deflection of control shaft 26. Denoting the speed of shaft 31 by $$\frac{ds}{dt}$$

we have (1) $$a + k_1\frac{da}{dt} = k_2\frac{ds}{dt}$$

where $k_1$ and $k_2$ are constants of proportionality. Now the speed of the "B" end of gear 40 is proportional to the deflection $s$ of control shaft 31. Therefore since the gun mount is driven from this "B" end the differential speed $$\frac{da}{dt}$$

of mount M is proportional to deflection $s$, so $$\frac{da}{dt} = k_3 s$$

or $$\frac{d^2 a}{dt^2} = -k_3\frac{ds}{dt}$$

where $k_3$ is a constant of proportionality.

Now substituting in (1) we have (a) $$\frac{d^2 a}{dt^2} + K_1\frac{da}{dt} + K_2 a = 0$$

where $$K_1 = \frac{k_1 k_3}{k^2} \text{ and } K_2 = \frac{k_3}{k^2}$$

Equation $a$ is of well known type characteristic of a system with inertia, restoring torque proportional to displacement from a stable position and damping proportional to velocity. By making $K_1^2 = 4K_2$ the damping is made critical so that while the gun mount M follows director D with almost no deviation it does not overrun or hunt.

The mechanism contributing the anti-hunt factor $f$ is indicated at 36 Fig. 1 and shown more in detail in Figs. 2 and 3. It comprises a gear pump 44 having its driving shaft 37 provided with gear 38 meshing with gear 24 driven by gear 23 on shaft 22. The output of the gear pump 44 is transformed into rotary motion by pressure developing means, which rotary motion turns shaft 41 carrying gear 42 meshing with gear 43 of the other side of differential 25. The shaft 22 thus drives one side of differential 25 while the other side is driven from the "anti-hunt" device 36, the output of differential 25 being the algebraic sum of these inputs. To develop the input factor $f$ the anti-hunt device has its gear pump 44 driven by shaft 37 (Figs. 2 and 3) to develop oil pressure between the passages 45, 46 in either direction depending on the direction of rotation of the gears. Passages 45, 46 are connected to opposite ends of cylinders 47, 48 respectively and so develop pressure against one end or the other of double ended piston 49, normally centered by springs 50. The piston rod 51 carries rack teeth engaging pinion 52 on output shaft 41 passing through stuffing box 53 and carrying gear 42 at its outer end. The piston ends are provided with passages 55 which permit a restricted flow of oil from one cylinder to the other.

Operation is as follows: Rotation of the input shaft 37 will actuate the gear pump 44 and unbalance the oil pressure on the two ends of the piston 49. Oil will flow from one cylinder to the other over the circuit indicated by the arrows. The piston 49 will move in the direction of reduced pressure until the restraining forces of the springs 55 balance the forces of pressure difference. For any given velocity of the shaft 37 the piston 49 will assume a definite position either to the left or right of center, depending upon the direction of rotation of the shaft. A change in velocity of the shaft 37 will alter the balance between the forces of pressure and the force of the springs and cause the piston to move to a new position of equilibrium.

The motion of the piston 49 is converted into angular motion at the shaft 41 by the rack and gear. Since angular motion of the shaft 41 depends upon motion of the piston 49, which in turn depends upon a change in pressure difference between the piston ends and since this pressure difference is a function of the velocity of the input shaft 37, the angular position of the shaft 41 is a function of the velocity of the shaft 37 and the velocity of the shaft 41 is a function of the rate of change of velocity of the shaft 37.

The characteristics of the anti-hunt device are so arranged as to make the constants of proportionality in each direction such that $K_1^2 = 4K_2$ as above explained, and thus attain a critical damping in each direction.

The system is therefore dead beat in operation while at the same time providing through motor 28 and hydraulic gear 40 the power for moving the gun mount M. All the operator has to do is to turn the hand wheels 10 as determined by his information and the gun mount will precisely follow. While relatively large powers are available from the drive there is little resistance at the control. The hand power is only required to turn the parts through differentials 16 and 25 to turn the control shaft of the light auxiliary gear 27. Very little effort is required by the operator to accurately control the power delivered to the gun mount.

Similarly when the automatic drive through high speed motor 9 is substituted for the hand operation the oil gear 40 provides the power and the anti-hunt device 36 gives the desired damping and close control. For this automatic gun control the magnetic clutch 14 is energized to disconnect the hand wheels 10 and the high speed motor 9 is connected to the high speed transmitter 8 by three wire cable 60 from the transmitter to contacts 61 of synchronizing relay 62, then through wires 63 and connections 64 to three wire cable 65 to contacts 66 of limit relay 67 and through three wire cable 68 to motor 9.

Any motion of the director D will therefore be imparted at a high angular speed to the motor 9 and the gun mount M once synchronized will reproduce continuously the position of the director by the self-synchronous action of the transmitter 8 and motor 9. By making the ratio of the angular speed of the transmitter 8 large with respect to the director movement, any aberration of the motor 9 will be minimized.

Safety stops are provided by hunt contacts 70, 71 at the low speed synchronizing motor 7, frame 72 of which is geared to turn with the gun mount as shown. At the extremes of movement of the mount lug 73 on frame 72 engages one or the other of contacts 70, 71 to close it and correspondingly energize the limit relays 67, 77, and disconnect the low and high speed motors 7, 9 from the transmitters 6, 8, and at the same time deenergizing the clutch 14, thus permitting it to connect the hand-wheels 10 to one side of differential 16 to resume manual control and bring the gun mount to rest. Energizing relay 67 opens contacts 66 of the high speed motor 9 and contacts 76 of the low speed motor and energizing relay 77 opens contacts 78 of the circuit for the magnetic clutch 14. Conversely when the mount moves so that both limit switches 70, 71 are open the limit relays 67, 77 will close to restore the automatic control.

To provide for synchronizing the gun mount for a large initial deviation between the director and the mount, the low speed motor whose frame is geared to the mount is connected electrically to the low speed transmitter 6. Three wire cable 80 leads to contacts 76 of limit relay 67, then to three wire cable 81 to the motor 7. The rotor 82 of motor 7 carries contact arm 83 which for deviation of the gun mount more than a predetermined amount from the direction will make contact with one or the other of stationary contact segments 84, 85. This contact energizes the synchronizing relay 62 and one or the other of synchronizing relays 86, 87, breaking contacts 61 and making contacts 88 or 89. If contact is made with segment 84 contacts 88 are closed to connect the high speed synchronizing transmitter 90 to high speed motor 9 in such manner as to cause the motor 9 to lead or lag by 60° whichever direction will impose a torque on the gun mount in a direction to reduce the deviation. Transmitter 90 is then connected by three wire cable 91 and contacts 88 to wires 63, contacts 64, three wire cable 65, limit contact 66 and three wire cable 67 to motor 9. Assuming a leading relation for the connection made by segment 83, there will then be an effective lead of the high speed control ahead of the gun mount and rotation of the mount in the direction to catch up with the director and until the mount and director are sufficiently nearly in agreement to move contact 83 from segment 84 when the control from transmitter 8 is restored. Similarly on contact of arm 83 with segment 85, connection will be correspondingly made through contacts 89 which shift the phase relation so that motor 9 will lag for leading arrangement with contacts 88 or lead for lagging arrangement with said contacts 88. Assuming a 60° lag between the rotor circuits of transmitter 99 and motor 9, that is, with the phases of the rotor of transmitter 90 in a direction opposite to the relation when contact 83 engages segment 84, this gives rotation of the gun mount in the opposite direction, which rotation will continue until contact at 83 is opened.

The constant catch up torque thus imposed on gun mount M rapidly reduces the deviation to cause arm 83 to leave the segment 84 or 85 so that when the gun mount arrives within a predetermined deflection from the angular position of the director, relays 62 and 86 or 87 are de-energized, the high speed motor is disconnected from the high speed transmitter 90 and reconnected to the director transmitter 8.

The transmitters 6, 8 and 90 and motors 7 and 9 are of the self-synchronous type having their fields and armatures relatively rotatable, the three-phase armatures being interconnected as above described and the fields 93, 94, 95, 96 and 97 supplied from a source of alternating current 74 by connecting conductors not shown. In this apparatus any convenient arrangement of parts and relative rotations may be used. In the embodiment shown, field coils 93, 94 of transmitters 6, 8 rotate with the gears 93', 94' meshing with the director gear 100. Armature 82 of motor 7 is rotatably carried by the frame 72 and carries the contact arm 83. Armature 101 of the transmitter 90 rotates with gear 102 driven by the gun mount gear 19, and armature 103 of motor 9 rotates with the gear 20.

The A. C. supply 74 also furnishes the current for magnetic clutch 14, two wire cables 96 connecting the leads 74 to relay contacts 78 and thence to the clutch. The solenoid currents for the synchronizing and limit relays are also in circuit with the supply 74, conductor 97, connecting relays 77 and 67 in series with limit contacts 70, 71 (in parallel with each other) to return conductor 98. The synchronizing relays are supplied by conductor 99 connected to have relay 62 in series with parallel circuits through relay 86 and segment 84 on one side and relay 87 and segment 85 on the other, thence through contact arm 83 to return wire 98.

The parts between output shaft 22 of differential 16 and control shaft 31 of main oil gear 40 may be replaced by a modified form of intermediate control means as shown for instance in Figs. 4 and 5. The power motor 28 drives the "A" end of the main hydraulic gear 40 as shown in Figs. 1, 4 and 5 and the control shaft 31 of said gear is geared through the gear 106 meshing with the gear 107 of the differential 108. Gear 107 turns with sleeve 109 carrying pinion 110 meshing with the rack 111 between work pistons 112, 113 in cylinders 114 and 115, the ports 116, 117 of which are controlled by piston valves 118, 119 connected by rack rod 120. Pistons 118, 119 slide in cylinder 121 having open ends 123, 124 communicating directly with the oil in the oil reservoir tank 125 in which the apparatus is located. Between pistons 118, 119 oil pressure is maintained through inlet 126 and piping 127 from the oil pressure pump 129 driven by pulleys and belting 128 from the shaft of motor 28.

Balanced pressures are thus maintained on both sides of each of these piston valves 118, 119 and in their normal central position they cover and close ports 116, 117 to hold the pistons 112, 113 in set position. Piston valves 118, 119 are driven by pinion 134 on shaft 133 connected to the differential spider 132 carrying the bevel gears 131 meshing with bevel gears 137' and 122'. The bevel gear 122' is rigid with an upper bevel gear 122 meshing with gear 105 connected to rotate with the output shaft 22 of the differential 16.

The "A" end of this auxiliary control is thus geared to the output of the differential 16, the "B" end being geared directly to control shaft 31 of the main hydraulic gear 40. For the operation of this auxiliary gear the oil pump 129 maintains oil at a predetermined pressure. The A end of the auxiliary gear is moved to an angle proportional to the deviation of the director D and the mount M. This offsets the valve pistons 118, 119, say to the right, uncovering the ports 116, 117 and connecting port 116 to the low pressure reservoir and port 117 to the high pressure supply between valves 118, 119. The pressure on pistons 112, 113 are thus unbalanced, and these pistons move to the left turning pinion 110 and gear 107 and control shaft 31 of the main oil gear 40 to drive the "B" end thereof in a direction to reduce the deviation between mount M and director D. Bevel gear 107 thus forms one side of the differential 108 and its movement through gears 107', 131 and 122' turns the shaft 133 to bring the valve pistons 118, 119 back to the neutral position covering and closing the ports 116, 117 so as to bring the work pistons 112, 113 to rest.

From this it follows that the motion of the "B" end is proportional to the motion of the "A" end with greatly increased torque available, the torque required to actuate the "A" end being very small in comparison to the available output torque.

The system of this invention thus combines the automatic and manual control so as to impose a minimum resistance on the initiating control members of each, while at the same time applying a multiplied and adequate force to accurately turn the gun mount. The apparatus involved is simple, avoiding electrical complications and depending in the main upon mechanical apparatus of established performance.

I claim:

1. In a control system for reproducing motion the combination with a gun mount of a director element, a motor means for supplying power to move said mount, control means for regulating said power, operating means for said control means comprising a synchronizing transmitter moving with said gun mount and actuating said control means to impart a relatively rapid movement to the gun mount under predetermined conditions, and a motor moving in synchronism with the director and actuating said control means to maintain said gun mount in substantial correspondence with said director under other predetermined conditions.

2. In a control system for reproducing motion the combination with a gun mount of a director element, a motor means for supplying power to move said mount, control means for regulating said power, operating means for said control means comprising a synchronizing transmitter moving with said gun mount and actuating said control means to impart a relatively rapid movement to the gun mount under predetermined conditions, a motor moving in synchronism with the director and actuating said control means to maintain said gun mount in substantial correspondence with said director under other predetermined conditions, and means for automatically rendering the synchronizing transmitter or the motor operative in accordance with the said predetermined conditions.

3. In a control system for reproducing motion the combination with a director element and a follower, of a source of power for the drive of said follower and means for controlling said power comprising differential means for comparing the relative speeds of the director and follower and moving a control member at a speed proportional to the difference in said speeds, differential means for modifying the motion of said member by a predetermined variable directly proportional to the difference in said speeds, and mechanical means for applying said modified motion to control the torque applied to said follower by said drive.

4. In a control system for reproducing motion the combination with a director element and a follower, of a source of power for the drive of said follower and means for controlling said power comprising differential means for comparing the relative speeds of the director and follower and moving a control member at a speed proportional to the difference in said speeds, differential means for modifying the motion of said member by a predetermined variable directly proportional to the difference in said speeds, and mechanical means for applying said modified motion to control the torque applied to said follower by said drive, said mechanical means including speed varying means between said power source and said follower.

5. In a control system for reproducing motion the combination with a director element and a follower, of a source of power to drive said follower and means for controlling said power comprising means for comparing the relative speeds of the director and follower and moving a member at a speed proportional to the difference in said speeds, means for modifying the motion of said member by a predetermined variable proportional to the difference in said speeds, mechanical means for applying said modified motion to control the torque applied to said follower by said drive, said mechanical means including speed varying means between said power source and said follower, and a second speed varying means for regulating said first named speed varying means.

6. In a control system for reproducing motion the combination with a director element and a follower, of a source of power to drive said follower and means for controlling said power comprising means for comparing the relative speeds of the director and follower and moving a member at a speed proportional to the difference in said speeds, means for modifying the motion of said member by a predetermined variable proportional to the difference in said speeds, mechanical means for applying said modified motion to control the torque applied to said follower by said drive, said mechanical means including speed varying means between said power source and said follower, and a second speed varying means driven from said power source and acting to regulate said first named speed varying means.

7. In a gun control system the combination with a gun mount and a director element, a driver for the gun mount, differential mechanism driven on one side in correspondence with said director element and one the other side in correspondence with said gun mount, and control means actuated by said differential mechanism and connected to said driver to vary the torque thereof to be proportional to the angular deviation between the gun mount and the director element, said control means having between said differential and said driver a second differential device subtracting from said control a corrective factor directly proportional to the differential speed of the gun mount and director element.

8. In a gun control system the combination with a gun mount and a director element, a driver for the gun mount, differential mechanism driven on one side in correspondence with said director element and on the other side in correspondence with said gun mount, and control means actuated by said differential mechanism and connected to said driver to vary the torque thereof to be proportional to the angular deviation between the gun mount and the director element, said control means having between said differential and said driver a second differential device subtracting from said control a corrective factor directly proportional to the differential speed of the gun mount and comprising a connection to said first mentioned differential, an anti-hunt device driven thereby and connected to drive the other side of said differential and a differential output connected to said driver for the gun mount.

9. In a control system for reproducing motion, the combination with a director and a follower, of a drive for said follower, control means therefor, and operating means for said control means, comprising means responsive to a deviation between the director and follower within a predetermined range for actuating the drive, and means responsive to a deviation between the director and follower in excess of said predetermined range for controlling said control means in accordance with a predetermined artificial deviation independent of the actual deviation for moving the follower into said range.

ARTHUR PATTISON DAVIS.